United States Patent
Xu et al.

(10) Patent No.: US 9,609,663 B2
(45) Date of Patent: Mar. 28, 2017

(54) TECHNIQUES FOR DECOUPLING DOWNLINK AND UPLINK OPERATIONS

(71) Applicant: QUALCOMM Incorporated, San Diego, CA (US)

(72) Inventors: Hao Xu, San Diego, CA (US); Tingfang Ji, San Diego, CA (US); Peter Gaal, San Diego, CA (US); Wanshi Chen, San Diego, CA (US); Yongbin Wei, San Diego, CA (US); Kiran Kumar Somasundaram, San Diego, CA (US); Miguel Griot, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 225 days.

(21) Appl. No.: 14/068,578

(22) Filed: Oct. 31, 2013

(65) Prior Publication Data
US 2014/0126497 A1    May 8, 2014

Related U.S. Application Data

(60) Provisional application No. 61/722,068, filed on Nov. 2, 2012.

(51) Int. Cl.
*H04W 4/00* (2009.01)
*H04W 74/00* (2009.01)
(Continued)

(52) U.S. Cl.
CPC ..... *H04W 74/002* (2013.01); *H04W 52/0229* (2013.01); *H04W 74/0833* (2013.01); *H04W 88/04* (2013.01)

(58) Field of Classification Search
CPC ..................................... H04W 28/04
(Continued)

(56) References Cited

U.S. PATENT DOCUMENTS

2007/0165581 A1*  7/2007  Mehta et al. ........... 370/338
2010/0041428 A1   2/2010  Chen et al.
(Continued)

FOREIGN PATENT DOCUMENTS

EP        2302965 A1       3/2011
WO    WO-2012027887 A1    3/2012

OTHER PUBLICATIONS

International Search Report and Written Opinion—PCT/US2013/068061—ISA/EPO—Feb. 20, 2014.
(Continued)

*Primary Examiner* — Christopher R Crompton
(74) *Attorney, Agent, or Firm* — Patterson & Sheridan, L.L.P.

(57) ABSTRACT

Techniques are provided for decoupling uplink and downlink operations. According to certain aspects, a wireless node (e.g., a low power node) may receive, from a base station of a first cell, signaling indicating a random access channel (RACH) configuration for a wireless device. The wireless node may then detect the wireless node performing a RACH detection (based on the RACH configuration) and report the RACH detection and desired UL configuration to the base station of the first cell. The base station of the first cell may then select the wireless node for serving the wireless device for UL operations (e.g., based on the reported RACH detection-and similar reports from other wireless nodes detecting the same RACH procedure).

24 Claims, 13 Drawing Sheets

(51) Int. Cl.
*H04W 52/02* (2009.01)
*H04W 74/08* (2009.01)
*H04W 88/04* (2009.01)

(58) Field of Classification Search
USPC ........................................................ 370/329
See application file for complete search history.

(56) References Cited

U.S. PATENT DOCUMENTS

| | | |
|---|---|---|
| 2010/0296467 A1 | 11/2010 | Pelletier et al. |
| 2011/0013542 A1 | 1/2011 | Yu et al. |
| 2011/0159867 A1 | 6/2011 | Kuo |
| 2012/0176960 A1 | 7/2012 | Zhang et al. |
| 2013/0201966 A1* | 8/2013 | Weng .................... H04W 72/04 370/336 |
| 2014/0036793 A1* | 2/2014 | Johnsson .............. H04W 72/04 370/329 |
| 2014/0161024 A1* | 6/2014 | Speight et al. ............... 370/315 |

OTHER PUBLICATIONS

Kyocera Corp, "Preamble-based Solution for CA HetNet ICIC macro-pico UL interference Scenario", 3GPP Draft; R3-120663, 3rd Generation Partnership Project (3GPP), Mobile Competence Centre ; 650, Route Des Lucioles ; F-06921 Sophia-Antipolis Cedex ; France vol. RAN WG3, No. San Jose del Cabo, Mexico; 20120326—20120330 Apr. 2, 2012 (Apr. 2, 2012), XP050669018, Retrieved from the Internet: URL:http://www.3gpp.org/ftp/tsg_ran/WG3_lu/TSGR3_75bis/Docs/.

* cited by examiner

TECHNIQUES FOR DECOUPLING DOWNLINK AND UPLINK OPERATIONS

CROSS-REFERENCE TO RELATED APPLICATIONS

The present patent application claims priority to U.S. Provisional Application Ser. No. 61/722,068, filed on Nov. 2, 2012, assigned to the assignee of the present application and hereby expressly incorporated by reference in its entirety.

FIELD OF THE DISCLOSURE

Certain aspects of the present disclosure generally relate to wireless communications and, more particularly, to techniques for decoupling downlink and uplink operations, such that a device may be served by different entities for downlink and uplink communications.

BACKGROUND OF THE DISCLOSURE

Wireless communication networks are widely deployed to provide various communication services such as voice, video, packet data, messaging, and broadcast services. These wireless communication networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In certain wireless communication systems, in addition to higher power "macro" eNodeBs, a number of relatively small, lower power nodes (e.g., "pico" eNodeBs or relays), may be deployed for capacity enhancements, for example to support machine type communications (MTC) devices. Such devices are typically low cost, low power, and are often deployed in difficult to reach locations, such as a basement. While the macro eNodeBs may have sufficient coverage to reach most MTC devices on the downlink, uplink communications for a given device may be more efficiently provided via a lower power node in close proximity to the devices (e.g., requiring lower uplink transmission power).

While allowing MTC devices to operate across systems with different types of base stations may help enhance service coverage, allowing different types of base stations to serve a same device for uplink and downlink communications present a challenge, for example, due to a need to identify and select low power nodes that are in proximity to a device.

SUMMARY OF THE DISCLOSURE

Certain aspects of the present disclosure provide a method for wireless communications by a wireless node. The method generally includes receiving, from a base station of a first cell, information about a random access channel (RACH) configuration for a wireless device, detecting, based on the RACH configuration, a RACH transmission from the wireless device, and reporting the detected RACH transmission to the base station of the first cell.

Certain aspects of the present disclosure provide a method for wireless communications by a base station. The method generally includes transmitting, to a wireless device, a random access channel (RACH) configuration, transmitting, to a wireless node, information about the RACH configuration for the wireless device, and receiving, from the wireless node, signaling indicating a RACH transmission detected by the wireless node based on the RACH configuration.

Certain aspects of the present disclosure provide a method for wireless communications by a wireless device. The method generally includes receiving, from a base station of a first cell, a random access channel (RACH) configuration, sending a RACH transmission based on the RACH configuration and receiving, from the base station of the first cell, signaling indicating a configuration of parameters for use in at least one of uplink and downlink communications with a wireless node that detected the RACH procedure.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
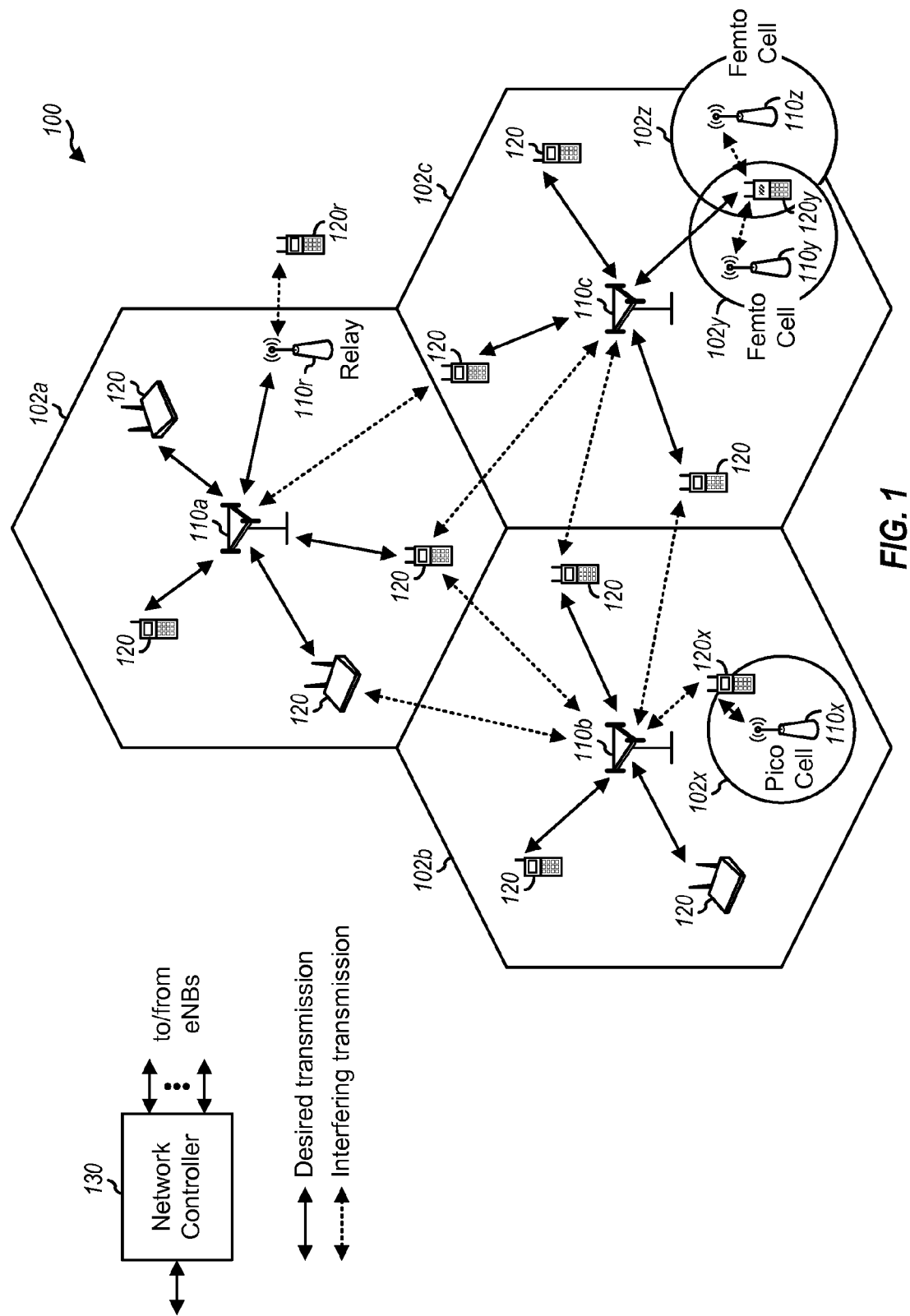
FIG. 1 is a block diagram conceptually illustrating an example of a wireless communications system, in accordance with an aspect of the present disclosure.

As noted above, in some cases, relatively dense deployment of low power nodes (LPNs) within a macro cell coverage area may be used to provide coverage enhancement, for example, for machine type communication (MTC) devices that may be low power and low cost or other devices that may have a high delay tolerance. Examples of such low power nodes (LPNs) may include pico base station, relays, or remote radio heads (RRHs). Such cell densification may reduce path loss to the closest LPN cell and may potentially enhance coverage while reducing energy consumption by reducing uplink transmission power.

Aspects of the present disclosure may help achieve these results by decoupling downlink and uplink communications, allowing optimal devices to be selected independently for uplink and downlink communications. For example, the techniques presented herein may allow downlink (DL) coverage for devices by high power nodes (e.g., a Macro cell eNodeB), while allowing uplink (UL) coverage by the cells with the smallest path loss (e.g., via a low power node closest to a UE). In order to achieve the decoupled DL and UL operations, technique are presented herein that allow a device to have different associations for DL and UL operations.

Certain factors may help enable decoupling of DL and UL communications for MTC devices, as presented herein. For example, MTC devices may be relatively delay tolerant, with relatively small packet sizes and low requirements regarding spectral efficiency (e.g., many such devices may only need to transmit a relatively small amount of data relatively infrequently). Such delay tolerance may allow sufficient time (e.g., on the order of seconds) for the information exchange between a Macro eNodeB and a low power node (LPN), as well as for a delayed response between RACH messages. The high delay tolerance may allow for a flexible HARQ turnaround requirement (e.g., on the order of milliseconds) for communication and data transmissions without channel state feedback (e.g., CQI).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

A base station ("BS") may comprise, be implemented as, or known as NodeB, Radio Network Controller ("RNC"), Evolved NodeB (eNodeB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A user equipment (UE) may comprise, be implemented as, or known as an access terminal, a subscriber station, a subscriber unit, a remote station, a remote terminal, a mobile station, a user agent, a user device, user equipment, a user station, or some other terminology. In some implementations, mobile station may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 is a block diagram conceptually illustrating an example of a telecommunications network system 100, in accordance with an aspect of the present disclosure. For example, the telecommunications network system 100 may be, for example, an LTE network and may include a number of evolved NodeBs (eNodeBs) 110 and user equipment (UEs) 120 and other network entities. An eNodeB 110 may be a station that communicates with the UEs 120 and may also be referred to as a base station, an access point, etc. A NodeB is another example of a station that communicates with the UEs 120.

Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.). An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications network system 100 may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications network system 100 may be a heterogeneous network that includes eNodeBs 110 of different types, e.g., macro eNodeBs 110a-c, pico eNodeBs 110x, femto eNodeBs 110y-z, relays 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

As will be described in greater detail below, aspects of the present disclosure allow for decoupled uplink and downlink service of devices, such as UEs 120, by different types of base stations with different transmit power levels, for example, with macro eNodeBs providing downlink service and lower power nodes, such as femto eNodeBs 110y-z and/or relays 110r/120r, providing uplink service.

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 130 may be coupled to a set of eNodeBs 110 and provide coordination and control for these eNodeBs 110. The network controller 130 may communicate with the eNodeBs 110 via a backhaul (not shown). The eNodeBs 110 may also communicate with one another, e.g., directly or indirectly via wireless (over the air "OTA") or wire line backhaul (e.g., X2 interface, not shown).

The UEs 120 (e.g., 120x, 120y, etc.) may be dispersed throughout the telecommunications network system 100, and each UE 120 may be stationary or mobile. A UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

Figure 2:
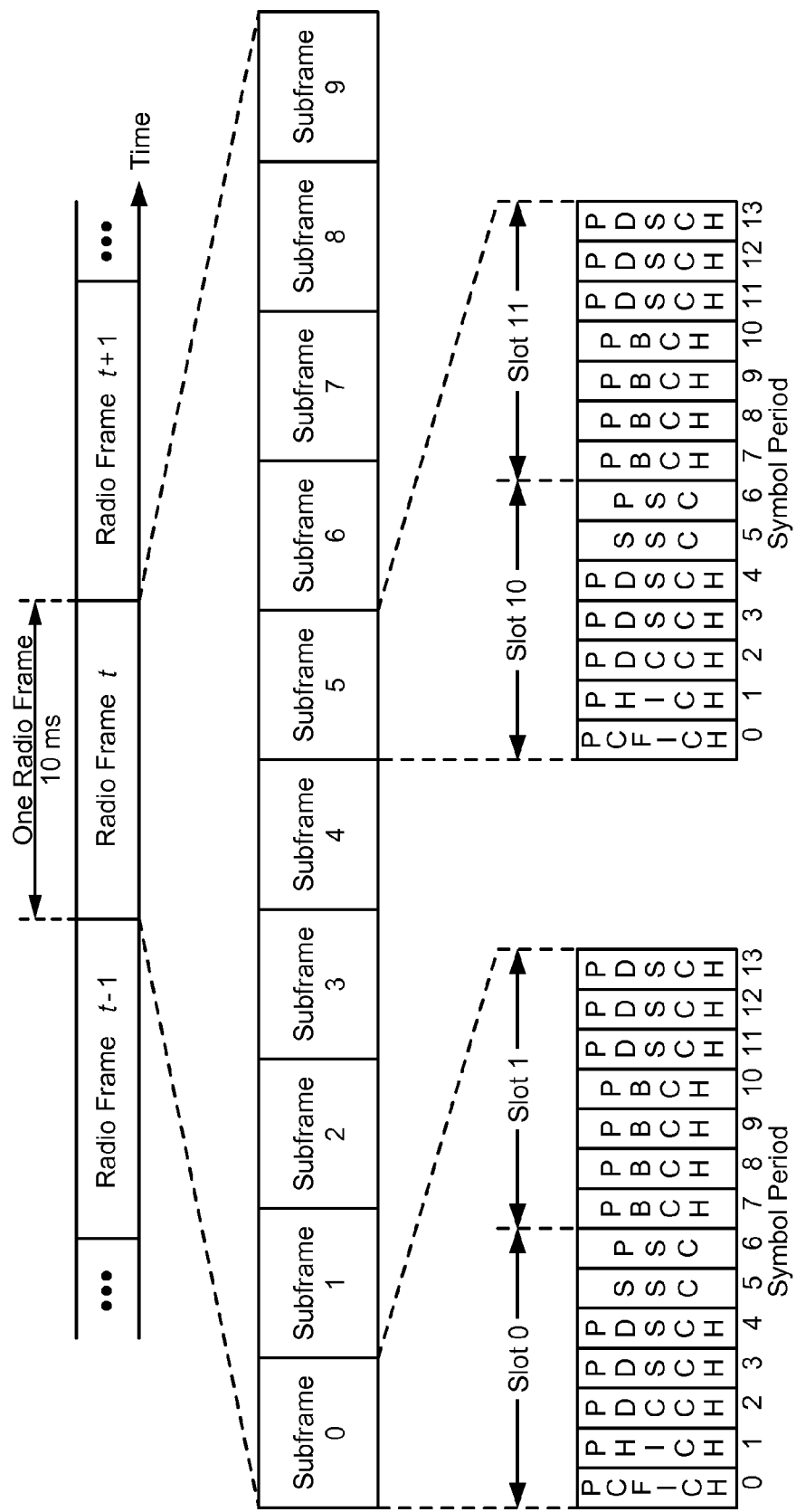
FIG. 2 is a block diagram conceptually illustrating an example of a downlink frame structure, in accordance with an aspect of the present disclosure.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively FIG. 2 is a block diagram conceptually illustrating an example of a downlink frame structure, in accordance with an aspect of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix (not shown). The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send system information in a Physical Broadcast Channel (PBCH) in symbol periods 0 to 3 of slot 1 of sub-frame 0.

The eNodeB may send information in a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send information in a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it may be understood that the PDCCH and PHICH are also included in the first symbol period. Similarly, the PHICH and PDCCH are also both in the second and third symbol periods, although not shown that way in FIG. 2. The eNodeB may send information in a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs (or other type base stations). One of these eNodeBs may be selected to serve the UE. The serving eNodeB may be selected based on various criteria such as received power, path loss, signal-to-noise ratio (SNR), etc.

Further, aspects of the present disclosure allow for multiple base stations to be selected based on such criteria, allowing for decoupled uplink and downlink service of devices. For example, a macro eNodeB may be selected to provide downlink service to a UE, based on received power of downlink reference signals, while a lower power node may be selected to provide uplink service to the same UE, based on path loss (e.g., determined based uplink transmissions from the UE as measured and reported by the lower power node).

Figure 3:
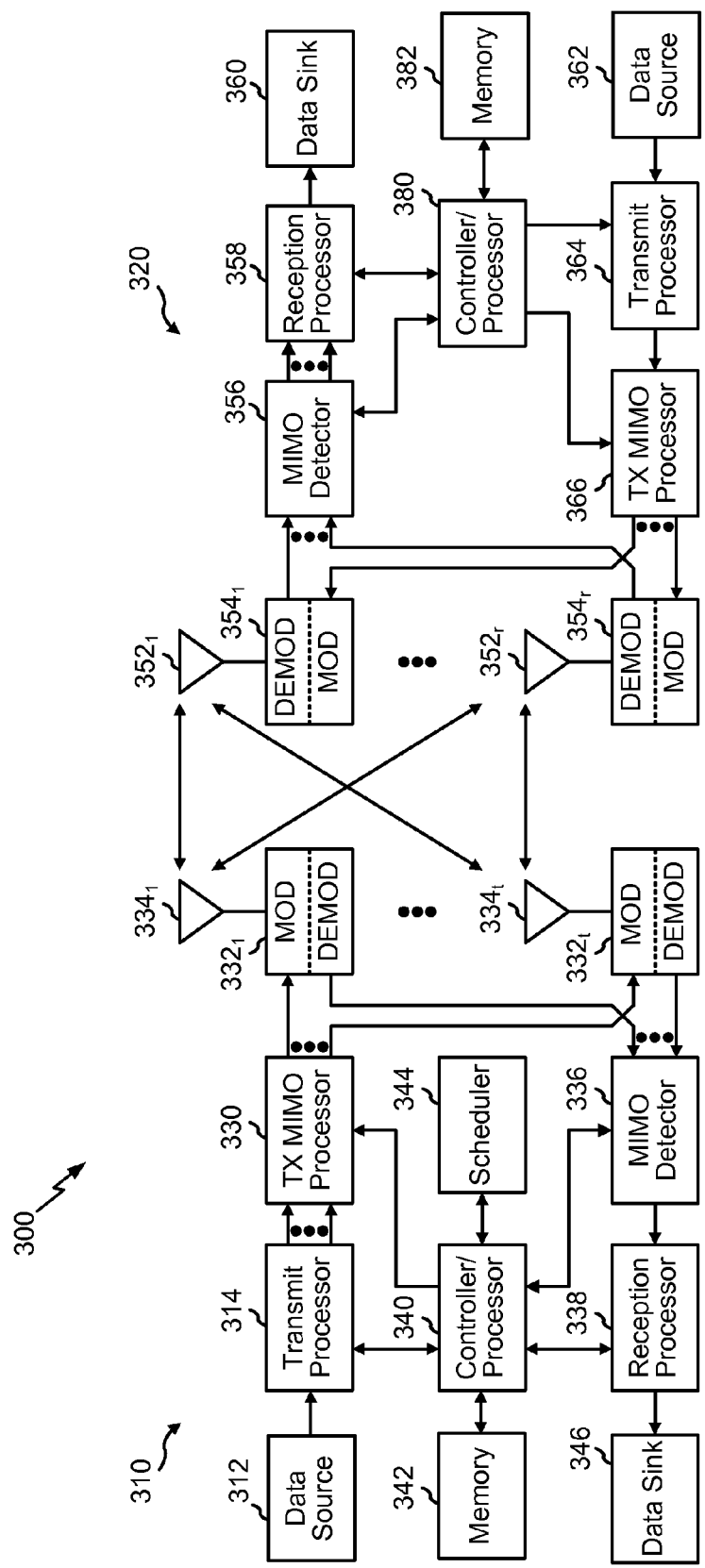
FIG. 3 is a block diagram conceptually illustrating an exemplary eNodeB and an exemplary UE, in accordance with an aspect of the present disclosure.

FIG. 3 is a block diagram conceptually illustrating an exemplary eNodeB 310 and an exemplary UE 320 configured in accordance with an aspect of the present disclosure. For example, the UE 315 may be an example of the UE 120 shown in FIG. 1 and capable of operating in accordance with aspects of the present disclosure.

The base station 310 may be equipped with antennas $334_{1-t}$, and the UE 320 may be equipped with antennas $352_{1-r}$, wherein t and r are integers greater than or equal to one. At the base station 310, a base station transmit processor 314 may receive data from a base station data source 312 and control information from a base station controller/processor 340. The control information may be carried on the PBCH, PCFICH, PHICH, PDCCH, etc. The data may be carried on the PDSCH, etc. The base station transmit processor 314 may process (e.g., encode and symbol map) the data and control information to obtain data symbols and control symbols, respectively. The base station transmit processor 314 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station modulator/demodulator 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 315, the UE antennas $352_{1-r}$ may receive the downlink signals from the base station 310 and may provide received signals to the UE modulators/demodulators (MODs/DEMODs) $354_{1-r}$, respectively. Each UE modulator/demodulator 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 320 to a UE data sink 360, and provide decoded control information to a UE controller/processor 380.

On the uplink, at the UE 315, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$ (e.g., for SC-FDM, etc.), and transmitted to the base station 310. At the base station 310, the uplink signals from the UE 315 may be received by the base station antennas 334, processed by the base station modulators/demodulators 332, detected by a base station MIMO detector 336 if applicable, and further processed by a base station reception processor 338 to obtain decoded data and control information sent by the UE 315. The base station reception processor 338 may provide the decoded data to a base station data sink 346 and the decoded control information to the base station controller/processor 340.

The base station controller/processor 340 and the UE controller/processor 380 may direct the operation at the base station 310 and the UE 315, respectively. The base station controller/processor 340 and/or other processors and modules at the base station 310 may perform or direct, e.g., the execution of various processes for the techniques described herein. The UE controller/processor 380 and/or other processors and modules at the UE 315 may also perform or direct, e.g., the execution of the functional blocks illustrated in FIGS. 4 and 5, and/or other processes for the techniques described herein. The base station memory 342 and the UE memory 382 may store data and program codes for the base station 310 and the UE 315, respectively. A scheduler 344 may schedule UEs 315 for data transmission on the downlink and/or uplink.

Figure 4:
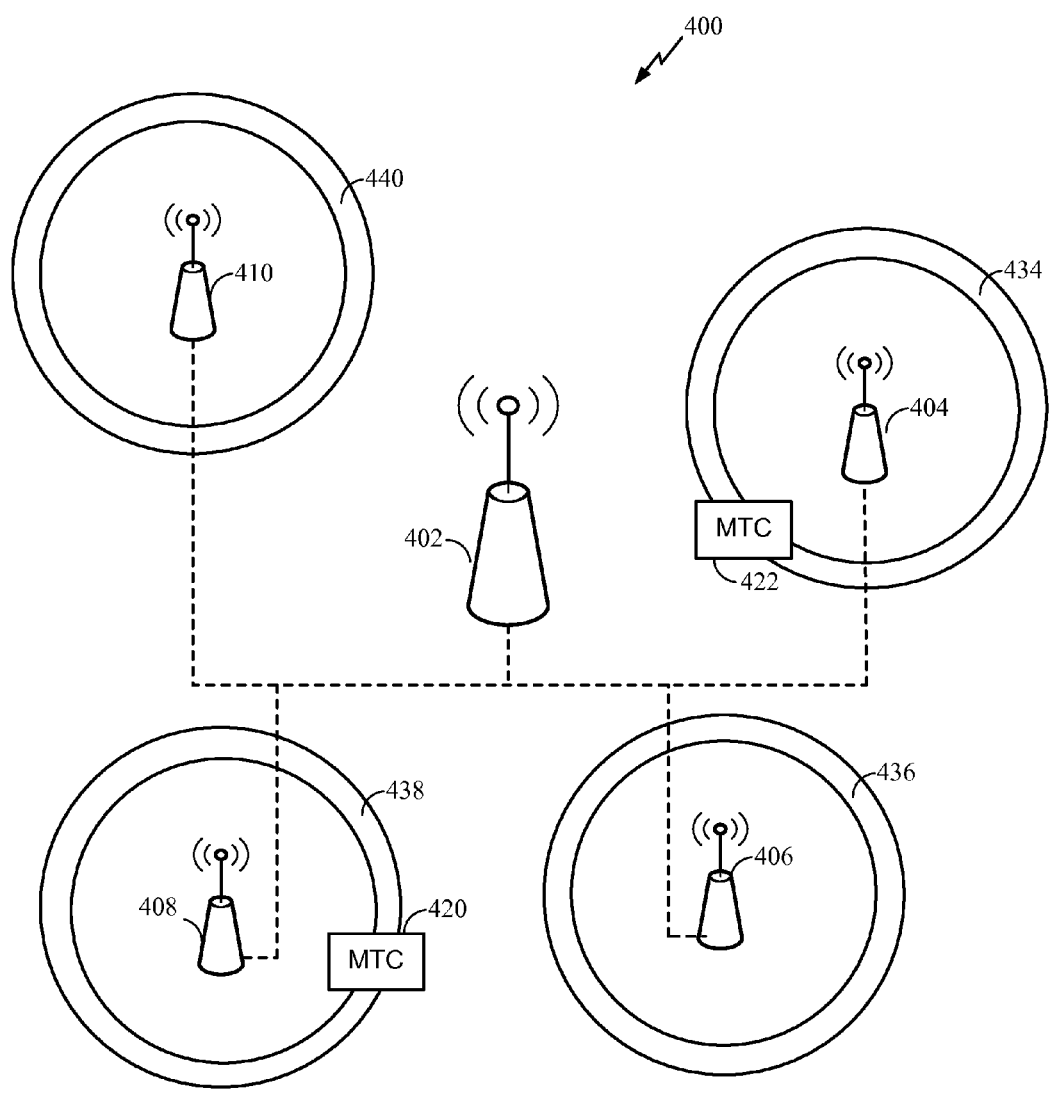
FIG. 4 is a block diagram conceptually illustrating an example of a heterogeneous wireless communications system, in accordance with an aspect of the present disclosure.

FIG. 4 is a block diagram conceptually illustrating an example of a heterogeneous wireless communications system 400, in accordance with an aspect of the present disclosure. In the illustrated example, a macro eNodeB 402 may be coupled to low power nodes (LPNs) 404, 406, 408, and 410, for example, via an interface (e.g., an X2 interface with optical fiber). As noted above, LPNs 404-410 may have lower transmit power relative to the macro eNodeB 402 and may be, for example, a pico base station, relays, or remote radio heads (RRHs). As such, the macro eNodeB 402 may have a coverage area that encompasses (or at least overlaps with) coverage areas of LPNs 404-410. The LPNs 404-410 and macro eNodeB 402 may be implemented, for example, using various components as shown for base station 310 shown in FIG. 3. Similarly, MTC devices 420 and 422 may be implemented, for example, using various components as shown for UE 320 shown in FIG. 3.

According to certain aspects, the LPNs 404-410 may be configured with the same cell identifier (ID) as the macro eNode 402 or with different cell IDs. If the LPNs 404-410 are configured with the same cell ID, the macro eNodeB 402 and the LPNs 404-410 may operate as essentially one cell controlled by the macro eNodeB 402. On the other hand, if the LPNs 404-410 and the macro eNodeB 402 are configured with different cell IDs, the macro eNodeB 402 and the LPNs 404-410 may appear to a UE as different cells, though all control and scheduling may still remain with the macro eNodeB 402.

Example Decoupling of Downlink and Uplink Operations

According to certain aspects of the present disclosure, there are various locations within the heterogeneous wireless communications system 400 in which UL and DL communications decoupling may occur. For example, each LPN (404, 406, 408, and 410) may have a corresponding region (434, 436, 438, 440) referred to as an UL service zone in which an MTC device (420, 422) may receive DL communications from the macro eNodeB 402 and transmit UL communications to an LPN 404-410. For example, within UL service zone 438, MTC device 420 may receive DL service from macro eNodeB 402 and UL service from LPN 408. Similarly, within UL service zone 434, MTC device 422 may receive DL service from macro eNodeB 402 and UL service from LPN 404.

In some cases, however, if the MTC device moves closer to an LPN (than the inner boundary of an UL service zone), then the MTC device may also receive DL service from the LPN rather than the macro eNodeB 402. In other words, within this area, the MTC may receive both UL and DL service from the LPN.

MTC devices may perform cell acquisition by searching for DL transmissions from cells with a best signal strength. From the signal with the best signal strength, the MTC devices may obtain a physical cell identifier (PCI) and maintain a time tracking loop (TTL) and frequency tracking loop (FTL). As will be described herein, an MTC device may, in effect, perform cell acquisition separately for DL and UL services. To this end, an MTC device may perform a separate random access channel (RACH) procedure (e.g., with a LPN cell identified as noted above based on signal strength).

Figure 11:
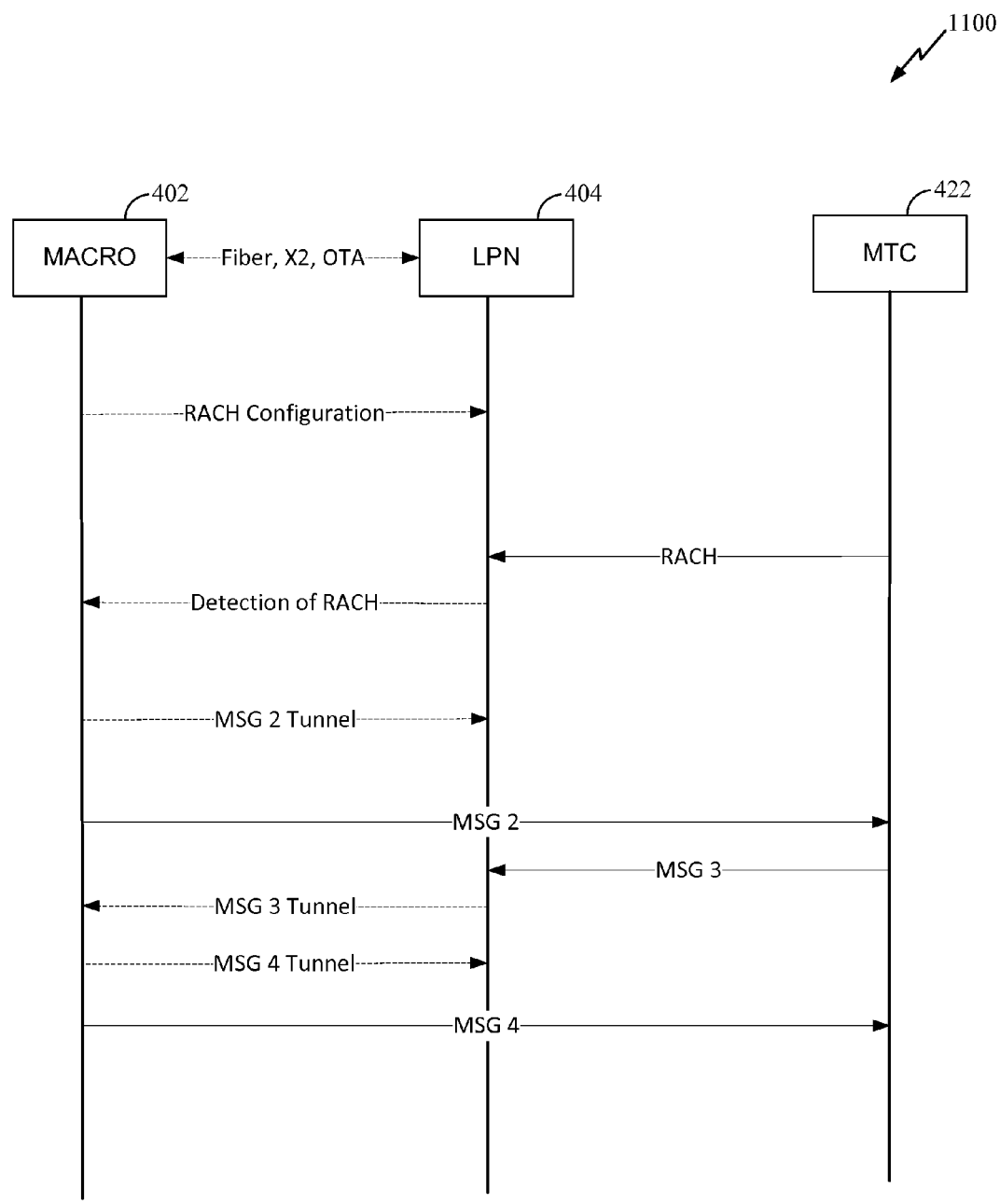
FIG. 11 illustrates an exemplary call flow diagram for a random access channel (RACH) procedure, in accordance with certain aspects of the present disclosure.

In some cases, a configuration for a RACH procedure by an MTC device may be carried in a system information block (SIB) targeting MTC devices-and this information may be shared with LPNs, allowing them to perform RACH detection. In some cases, this RACH configuration may be linked to the Macro cell ID and may include RACH sequence, timing, and power information. In some cases, the RACH configuration may also include timing for RACH messages (such as a MSG2 RACH response and/or MSG3 RRC connection request messages shown in FIG. 11), as well as modulation and coding scheme (MCS) and resource block (RB) assignment information. In some cases, such information may be shared with multiple LPNs within a macro eNodeB coverage area, allowing them to perform RACH detection for an MTC device. In an example, a plurality of LPNs within a macro eNodeB coverage area may detect a RACH message from an MTC device. As described below, the plurality of LPNs may send measurement reports for MTC RACH detection (e.g., indicating a receive signal strength or signal to noise ratio), allowing a macro eNodeB to select one (or more) of the plurality of LPNs for providing UL service (e.g., the LPN with the strongest reported signal strength for MTC RACH detection) for the MTC device.

Figure 5:
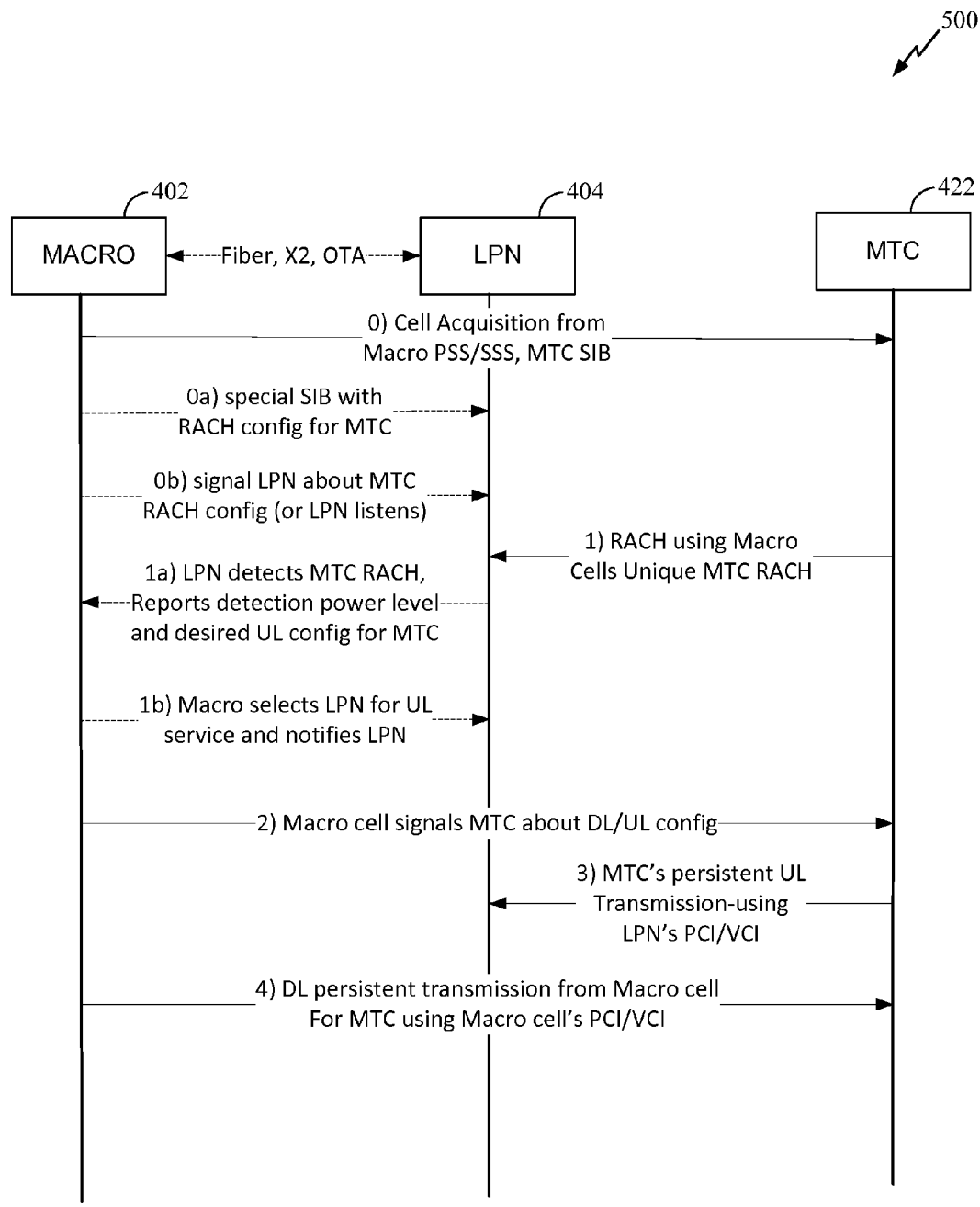
FIG. 5 illustrates an exemplary call flow diagram for an exchange of transmissions between entities of FIG. 4, in accordance with certain aspects of the present disclosure.

FIG. 5 illustrates an exemplary call flow diagram 500 for an exchange of transmissions for a RACH procedure involving MTC device 422, macro eNodeB 402, and LPN 404 of FIG. 4, in accordance with certain aspects of the present disclosure. While a single LPN 404 is shown, it should be understood that several LPNs (in a dense deployment) may be independently performing similar operations to those described herein (e.g., and each reporting RACH detection).

As illustrated at step 0a), macro eNodeB 402 may configure MTC device 422 with a RACH configuration (e.g., via a special MTC SIB transmission). At step 0, the MTC device 422 performs cell acquisition, for example, based on macro PSS/SSS signals and/or the MTC SIB transmission. For example, MTC device 422 may receive PSS/SSS signals and/or an MTC SIB transmission broadcasted by the macro eNodeB 402 and the MTC device 422 may perform cell acquisition. As illustrated, at step 0b), the macro eNodeB 402 may also signal the MTC RACH configuration to LPNs 404 (e.g., via fiber, X2 or OTA). As an alternative, LPN 404 may acquire this information by listening (e.g., detecting the MTC SIB transmission).

In any case, having obtained the MTC RACH information (e.g., a unique MTC RACH preamble and timing of MTC RACH occasion), LPNs 404 may be able to detect an MTC RACH procedure (e.g., associated with a macro eNodeB 402) from the MTC device 422 and report the corresponding power measurement and/or a desired UL configuration to the macro eNodeB 402. In this way, the macro eNodeB 402 may select one or more of the best LPNs for providing UL (and/or DL) service to MTC device 422.

At step 1, MTC device 422 performs a RACH procedure (e.g., using the MTC RACH information having a macro eNodeB ID provided by macro eNodeB 402). Additional detail of the RACH procedure, according to one embodiment, is described below with reference to FIG. 11. Having obtained the MTC RACH information, one or more LPNs 404 is able to detect the MTC RACH, at 1a, and report the detected power level to macro eNodeB 402. As illustrated, the one or more LPNs 404 may also send desired UL configurations for serving the MTC device 422.

In the illustrated example, at step 1b) macro eNodeB 402 selects one or more LPNs 404 for providing UL service to MTC device 422, based on the reported RACH detection. In some embodiments, LPNs may indicate a signal strength of the RACH detection indicated in the report. In some embodiments, LPN 404 may only report when a RACH transmission has been detected above a threshold strength (e.g., receive strength or SNR), such that the report itself indicates the RACH transmission was detected with at least that threshold strength (which may be signaled to the LPN 404 by the macro eNode B 402). In any case, the macro eNodeB may notify one or more LPNs 404 of its selection. The macro eNodeB 402 may also signal information to the one or more LPNs 404, for example, indicating parameters for use in serving MTC device 422 on the UL and/or DL (e.g., an UL and/or DL configuration). In some cases, if joint UL reception is desired, the macro eNodeB 402 may inform a plurality of LPNs 404 of the joint processing configuration in order to serve the MTC device 422. Similarly, if joint DL transmission is desired, the macro eNodeB 402 may also inform a plurality of LPNs 404 that they have been selected for DL service to the MTC device 422.

At step 2, the macro eNodeB 402 signals MTC device 422 about its UL and DL configurations, allowing the MTC device 422 to receive DL transmissions from macro eNodeB 402 and to perform UL transmissions (e.g., via LPN 404). This information may be provided, for example, in a MSG2 (random access response). The UL and DL configuration information may include time for DL and UL transmission, power for UL transmission, physical cell identifier (PCI) or virtual cell identifier (VCI) for DL and UL transmissions, physical downlink shared channel (PDSCH) and/or physical uplink shared channel (PUSCH) assignment (e.g., for contention resolution), persistent assignment for data transmission (e.g., RB and/or MCS).

Having successfully decoupled uplink and downlink communications, at step 3, MTC device 422 may send UL transmissions (using the configuration information received at step 2, for example, the LPN's 404 physical cell identifier (PCI) or virtual cell identifier (VCI)) to LPN 404 and, in some cases, receive DL transmission from macro eNodeB 402, at step 4. In other words, the LPN 404 may also serve DL transmissions for the MTC device 422 when the LPN 404 is selected by the macro eNodeB 402 to serve the DL transmissions.

In some cases, certain routine procedures may be adjusted to account for the decoupling of UL and DL service, for example, to provide MTC devices with control information for UL transmissions (to an LPN) via a macro eNodeB (since it still provides DL service). For example, with regards to time tracking, a timing advance (TA) command may also be sent from a macro eNodeB, to be applied by an MTC device when transmitting on the uplink to an LPN. For frequency tracking, the LPN may maintain a FTL for UL frequency compensation or the macro eNodeB may signal the MTC a frequency offset to apply for UL transmission. Such timing advance and/or frequency offset adjustments may be applied, for example, by MTC device 422 when sending UL transmission in step 3 of FIG. 5. In some cases, such tracking may not be needed, for example, if LPNs and macro eNodeBs are synchronized (or frequency offset is small and can be handled by FTL at LPN). Regarding power control, an initial transmit power setting for UL data may decided by the LPN, but this setting may be transmitted from a macro eNodeB to the MTC device. Subsequent slow power control adjustment may also be signaled from the macro eNodeB to the MTC (e.g., on behalf of the LPN).

Techniques presented herein may handle UL traffic initiated by an MTC device (e.g., when an MTC device wakes up and starts cell acquisition followed by RACH procedure (as shown in FIG. 5). With regards to MTC initiated DL traffic, even if the traffic is on the downlink, the MTC device may still initiate the RACH procedure first, for example, to pull the data instead of having the network push the data. In this case, the techniques described above may still be used to decouple UL and DL operations. For network initiated DL traffic, the network may need to page the MTC. Pages may be sent in a paging area periodically monitored by MTC devices (e.g., from the strongest DL cell). The paging configuration for MTC can be signaled in SIB or configured to each device. In any case, if an MTC device detects paging, it may initiate a RACH procedure and, again, the techniques described above may still be used to decouple UL and DL operations.

Figure 6A:
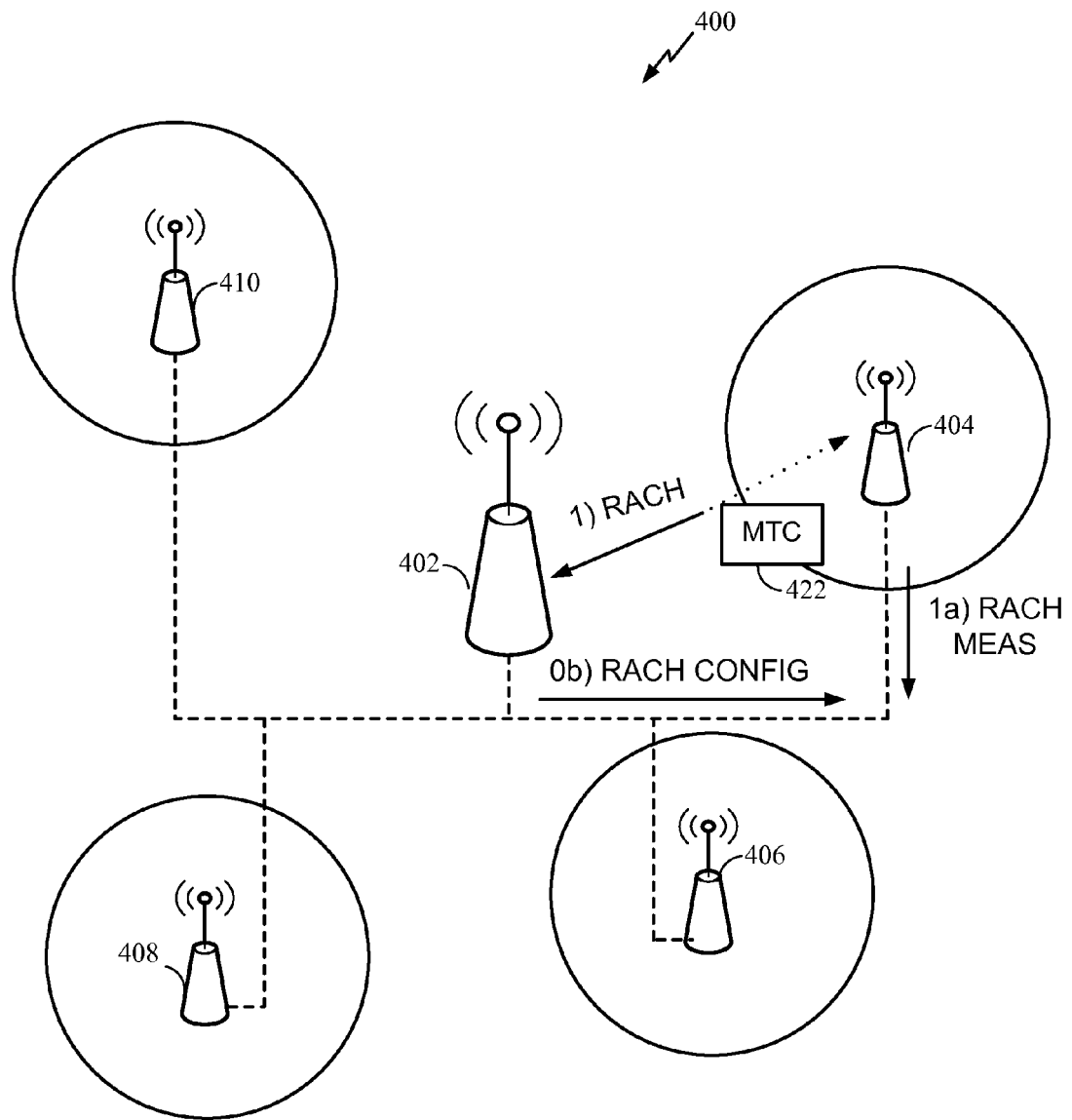
FIGS. 6A, 6B, and 6C illustrate how different steps of the flow diagram shown in FIG. 5 are performed by entities in FIG. 4, in accordance with certain aspects of the present disclosure.
Figure 6B:
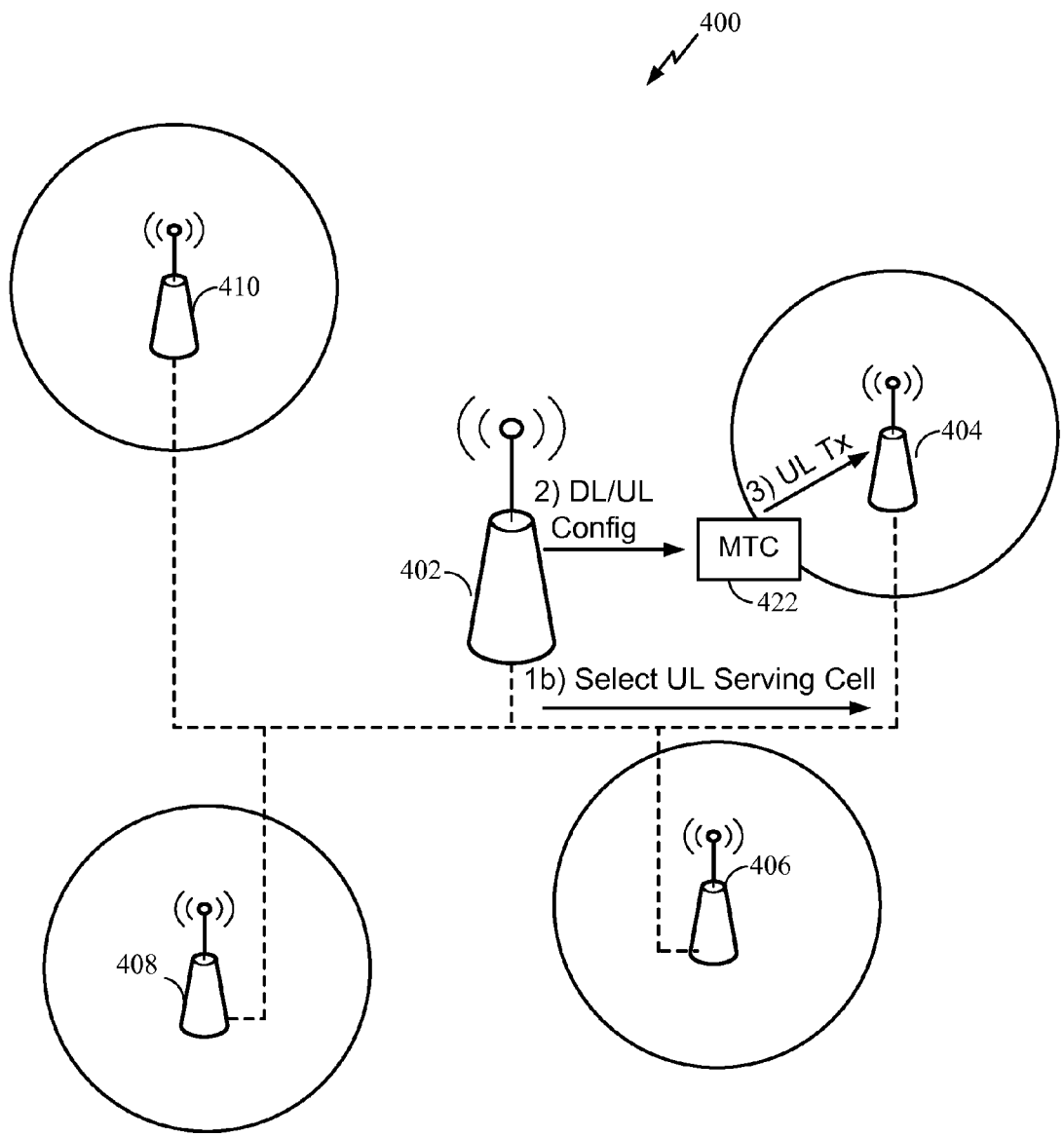
Figure 6C:
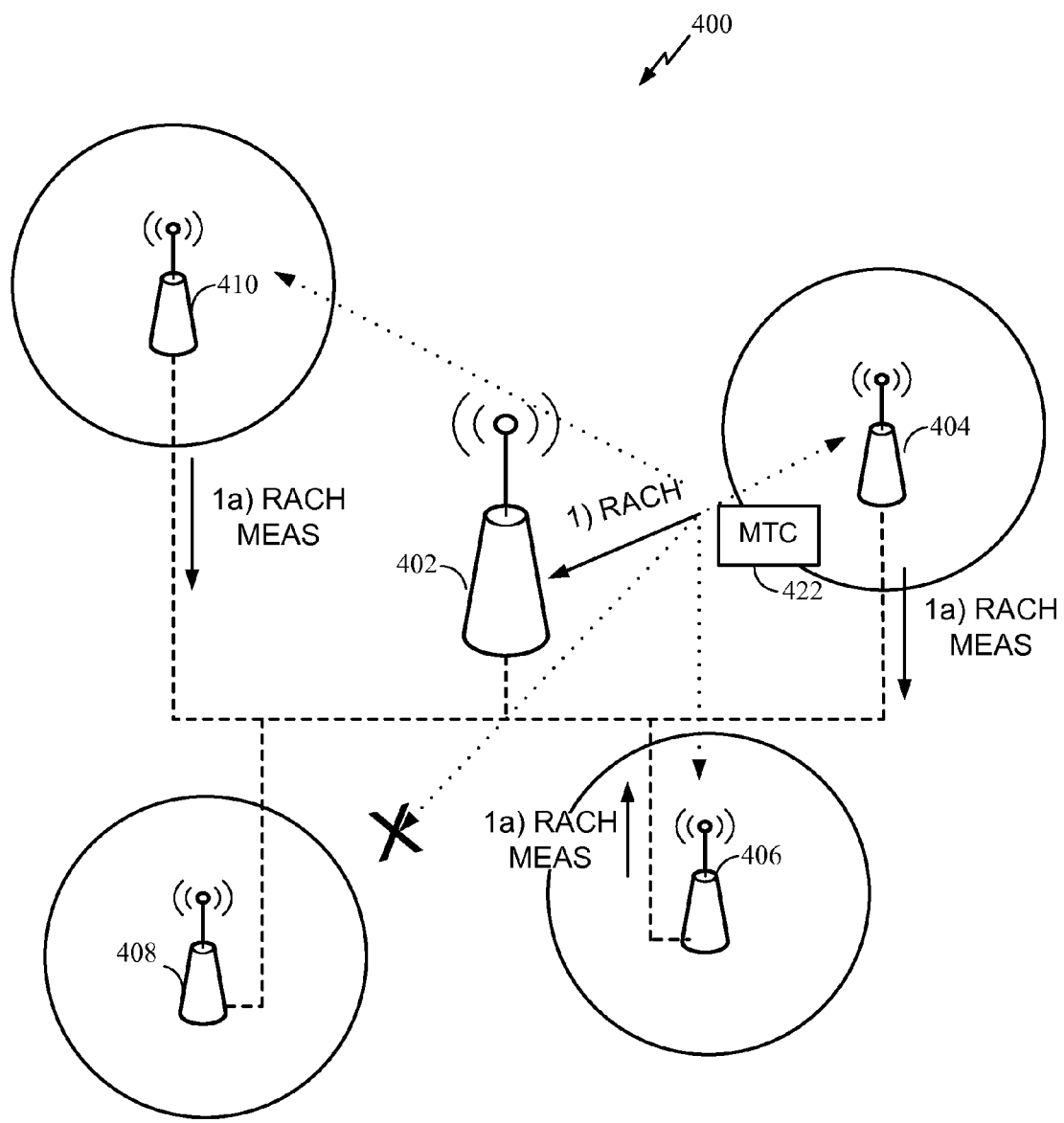
Figure 7:
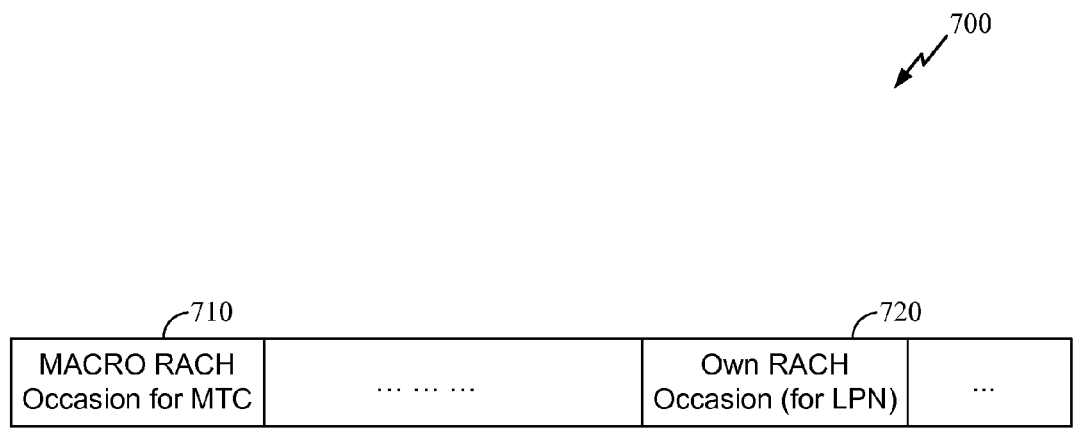
FIG. 7 illustrates different RACH occasions for a macro base station and a low power node, in accordance with certain aspects of the present disclosure.

FIGS. 6A-C illustrate the steps shown in FIG. 5, using the heterogeneous wireless communications system 400 shown in FIG. 4, and refer to the steps by the same labels. As illustrated in FIG. 6A, at step 0a, macro eNodeB 402 signals the MTC RACH configuration to one or more LPNs 404, 406, 408 and 410. The MTC RACH configuration may include timing information allowing the LPN 404 to identify RACH occasions for MTC device 422 that may be served by the macro eNodeB 402, in addition to its own RACH occasions (e.g., devices served by the LPN 404). This is illustrated in FIG. 7, which illustrates MTC RACH occasions 710 (during which the LPN 404 may monitor for RACH transmissions from MTCs for which it may be selected for UL service by the macro eNodeB 402), as well as its own RACH occasion 720 (e.g., in which it monitors for "non-MTC" RACH transmissions). In some cases, MTC RACH occasions 710 may occur less frequently than RACH occasions 720.

According to certain aspects, LPNs may be kept in dormant states (e.g., to conserve power) and may awake only occasionally, for example, to monitor for RACH transmissions (e.g., occasions in 710 and/or 720). If initially the LPN is in a dormant state, e.g. not transmitting DL synchronization signals, but monitoring UL transmissions, then the LPN may awake based on the strong received signal from the MTC (e.g., as detected in an MTC RACH occasion 710). In this case, the Macro cell can further determine (e.g., based on a strength of the RACH detection reported by the LPN) whether it is beneficial to handover the MTC to the LPN for both DL and UL, and inform the MTC UE about the DL serving cell change.

Referring back to FIG. 6A, with knowledge of the MTC RACH configuration, the LPN 404 may detect when MTC device 422 performs the RACH procedure, at step 1. The LPN 404 may then report the measured RACH detection (e.g., power or SNR, possibly along with a desired UL configuration) to macro eNodeB 402, at step 1a.

As illustrated in FIG. 6B, based on the RACH detection measurement reported by LPN 404 (and possibly similar reports from other LPNs 406, 408 and 410), macro eNodeB 402 may select LPN 404 for UL service for MTC device 422 and signal this selection, at step 1b. At step 2, the macro eNodeB 402 signals the DL/UL configuration to the MTC device 422. At step 3, the MTC device 422 transmits on the UL to LPN 404, based on the UL configuration provided by the macro eNodeB 402.

While the simple example illustrated in FIGS. 6A and 6B shows only a single LPN (LPN 404) detecting and reporting the RACH transmission from MTC device 422, in many cases, multiple LPNs may detect and report a RACH transmission from MTC device 422. For example, FIG. 6C illustrates an example where LPN 404, 406, and 410 all detect the RACH transmission from MTC device 422. In this case, the macro eNodeB 402 may select one (or more) of the LPNs that reported for UL service of MTC device 422. In some cases, the selection may be based on the reported signal strength of the detected RACH transmission and/or other factors, such as load balancing.

As illustrated in FIG. 6C, LPN 408 may be too far from MTC device 422 to detect the RACH transmission from MTC device 422. In some cases, an LPN may only send a measurement report if it has detected the RACH transmission with a sufficient strength (e.g., receive power of SNR above a threshold value). This may limit traffic on the backhaul connection in cases where an LPN is not well suited for UL service anyway.

In some cases, UL transmissions may be pre-scheduled during the procedure described above. For example, referring to FIGS. 6A-6C, macro eNodeB 422 may pre-schedule a PUSCH transmission (to the selected LPN 404) according to a backhaul delay and notify the LPN of this transmission. This may allow the LPN to get ready for reception. In some cases, resources for UL transmissions may not be reused among LPN. Further scheduling optimization may also be performed, for example, to enable UL cell splitting, for example, if PUSCH could be scheduled in a Space-Division Multiple Access (SDMA) fashion. In some cases, to reduce wake-up time by an MTC device (e.g., for power saving), LPN 404 may be configured to directly send DL PHICH to a MTC device (e.g., if the MTC device is interference limited).

Figure 8:
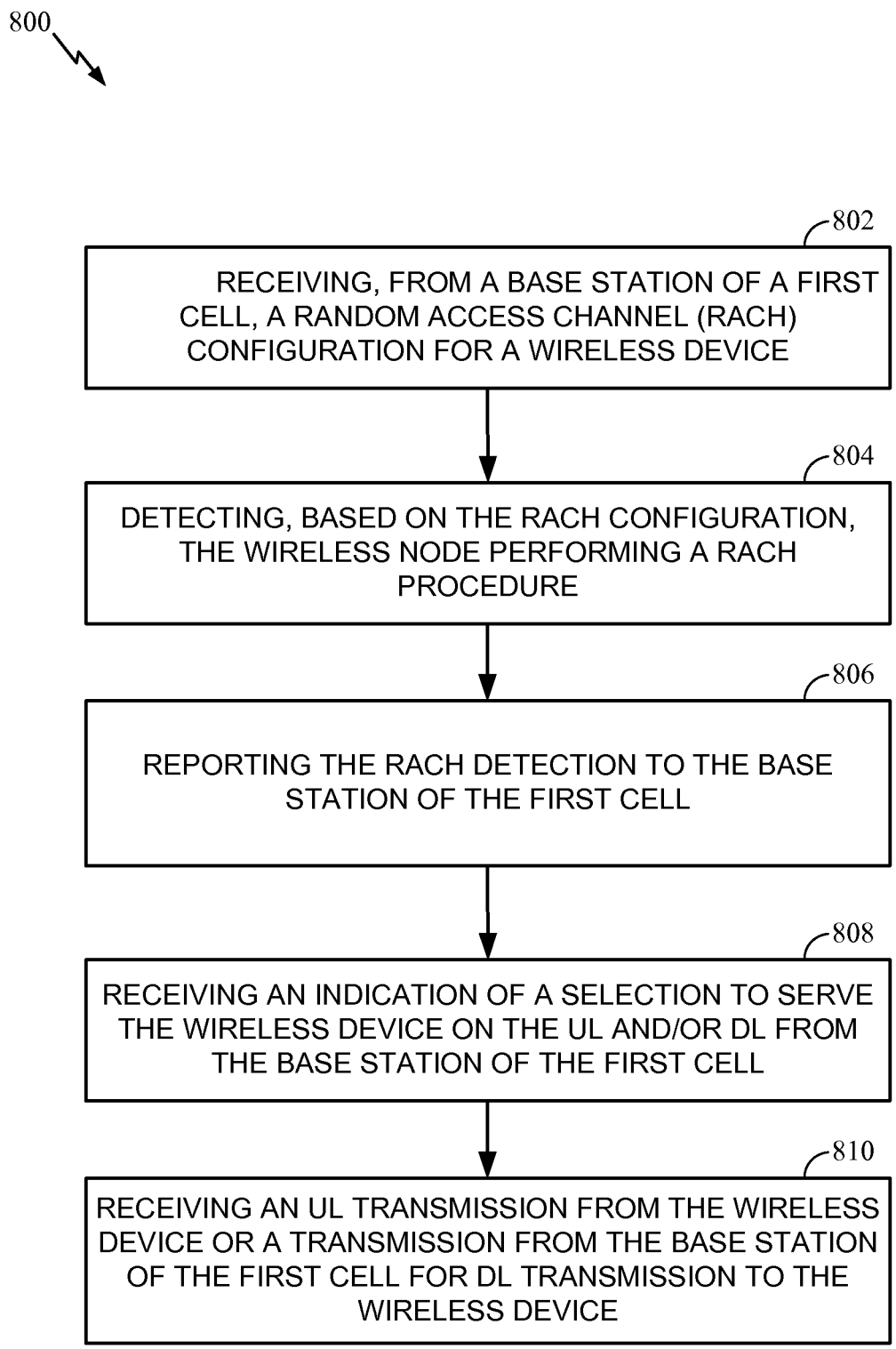
FIG. 8 illustrates an exemplary method (e.g., that may be performed by a low power node) for decoupling uplink and downlink communications, in accordance with an aspect of the present disclosure.

FIG. 8 illustrates an exemplary method 800 for decoupling uplink and downlink communications, in accordance with an aspect of the present disclosure. The method 800 may be performed by a wireless node, such as LPN 404 described above with reference to FIGS. 4, 5, 6A, 6B and 6C.

The method 800 begins, at 802, by receiving, from a base station of a first cell, information about a random access channel (RACH) configuration for a wireless device. At 804, the wireless node detects based on the RACH configuration, a RACH transmission from the wireless node. At 806, the wireless node reports the detected RACH transmission to the base station of the first cell. At 808, the wireless node receives an indication of a selection to serve the wireless device on the UL and/or DL from the base station of the first cell. The wireless node may also receive UL and/or DL configuration information from the base station of the first cell. At 810, the wireless node may receive an UL transmission from the wireless device or a transmission from the base station of the first cell for DL transmission to the wireless device.

Figure 9:
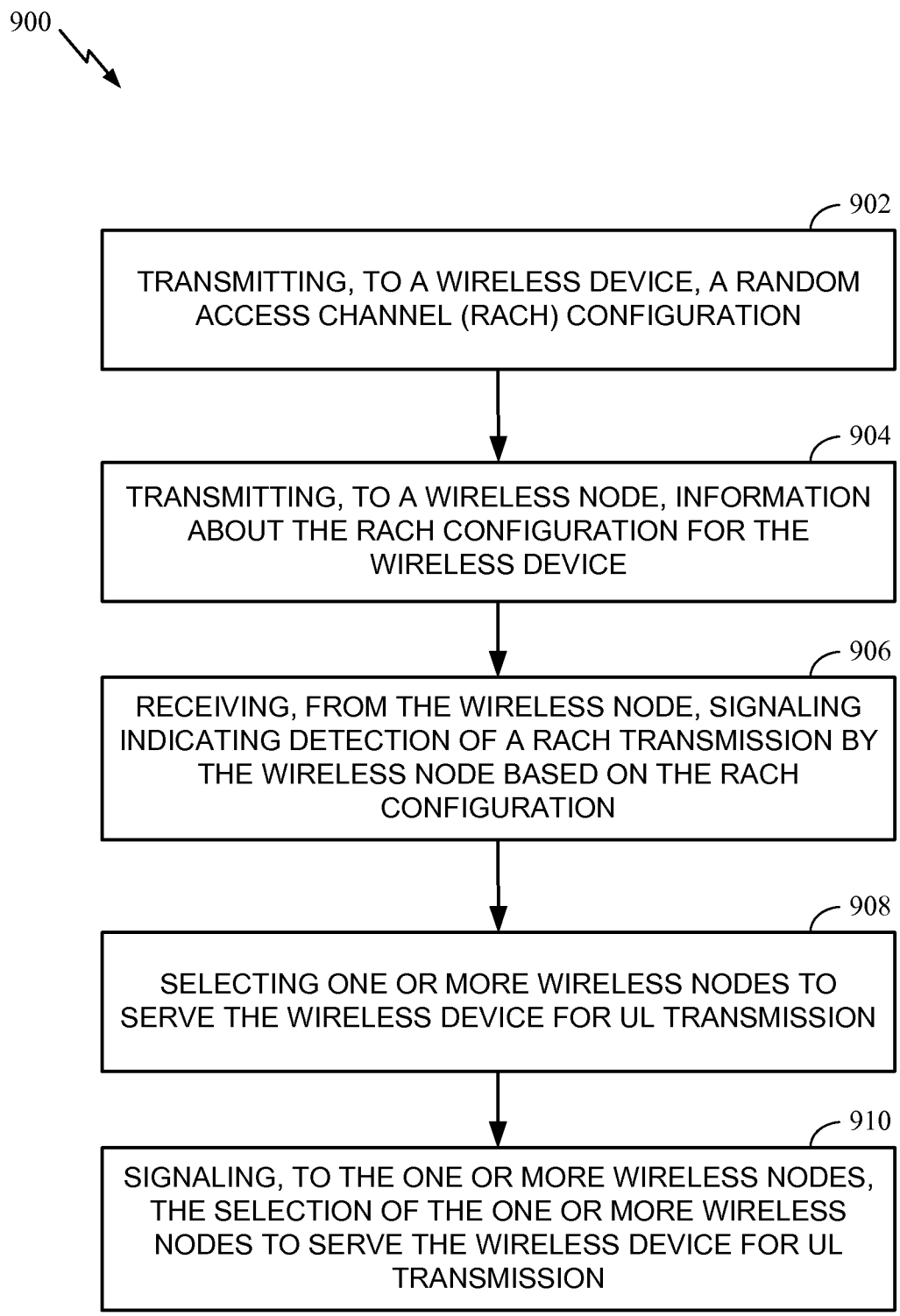
FIG. 9 illustrates an exemplary method (e.g., that may be performed by a macro eNodeB) for decoupling uplink and downlink communications, in accordance with an aspect of the present disclosure.

FIG. 9 illustrates an exemplary method 900 for decoupling uplink and downlink communications, in accordance with an aspect of the present disclosure. The method 900 may be performed by a base station, such as macro eNodeB 402 described above with reference to FIGS. 4, 5, 6A, 6B and 6C.

The method 900 begins, at 902, by transmitting, to a wireless device, a random access channel (RACH) configuration. At 904, the base station transmits, to one or more wireless nodes, information about the RACH configuration for the wireless device. At 906, the base station receives, from one or more wireless nodes, signaling indicating detection of a RACH transmission by the wireless nodes based on the RACH configuration. At 908, the base station selects, one or more wireless nodes to serve the wireless device for UL transmission. At 910, the base station, may signal to the one or more wireless nodes the selection of the one or more wireless nodes to serve the wireless device for UL transmission.

Figure 10:
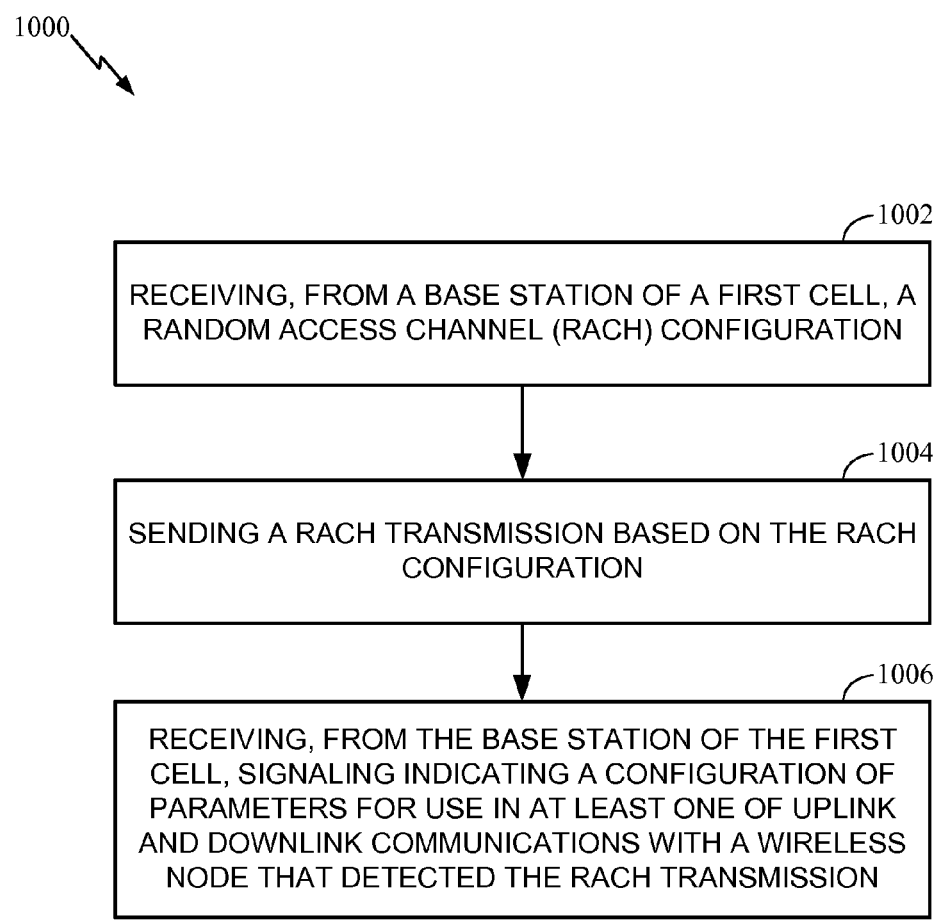
FIG. 10 illustrates an exemplary method (e.g., that may be performed by a wireless device, such as a UE) for decoupling uplink and downlink communications, in accordance with an aspect of the present disclosure.

FIG. 10 illustrates an exemplary method 1000 for decoupling uplink and downlink communications, in accordance with an aspect of the present disclosure. The method 1000 may be performed by a wireless device, such as MTC device 422 described above with reference to FIGS. 4, 5, 6A, 6B and 6C.

The method 1000 begins, at 1002, by receiving, from a base station of a first cell, a random access channel (RACH) configuration. At 1004, the wireless device sends a RACH transmission based on the RACH configuration. At 1006, the wireless device receives, from the base station of the first cell, signaling indicating a configuration of parameters for use in at least one of uplink and downlink communications with a wireless node that detected the RACH procedure.

In some cases, additional operations may be performed as part of the RACH procedure described above. For example, as illustrated in the call flow diagram 1100 of FIG. 11, if contention resolution is needed, a MSG 3 and MSG 4 may be sent. As the RACH operation is monitored by the LPN 404, certain RACH messages may be exchanged (tunneled) between macro eNodeb 402 and the LPN 404. For example, MSG 2 (e.g., containing UL/DL configuration information) may be tunneled to LPN 404, which may also be used to inform the LPN 404 it has been selected to provide UL service. Further, if needed, MSG 3 (detected by LPN 404) may be tunneled to macro eNodeB 402, while a MSG 4 sent in response may be tunneled to LPN 404.

As noted above, timing requirements for receiving this MSG2 may be adjusted to account for additional time for the signaling of information between the LPN 404 and macro eNodeB 402. As noted above, this signaling may involve the LPN signaling RACH detection (e.g., power or SNR) to the macro eNodeB 402 and, possibly, desired UL transmission configurations (e.g., including transmission power, timing advance, RB assignment, MCS) to the macro eNode B 402 (e.g., to be signaled to the MTC device 422).

According to certain aspects, a macro eNodeB may handle all the core network side of communications, which may work since, from the perspective of the MTC device, the macro eNodeB cell may still be considered the serving cell. As an alternative, however, the LPN may handle some or all core network side of communications.

While the techniques are described herein with reference to a UE capable of communicating in LTE and 3G networks (GSM and/or UMTS), the techniques presented herein may be applied in a variety of different RAT networks.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a mobile station and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a wireless node, comprising:
    receiving, from a base station of a first cell, information about a random access channel (RACH) configuration for a wireless device;
    detecting, based on the RACH configuration, a RACH transmission from the wireless device;
    reporting the detected RACH transmission to the base station of the first cell; and
    receiving, from the base station of the first cell, first signaling indicating one or more parameters for use in performing at least one of uplink or downlink communications with the wireless device based on the reported RACH transmission, wherein the one or more parameters include at least one of timing advance parameters for uplink transmissions, power adjustment parameters, a virtual cell identification, or a modulation and coding scheme.

2. The method of claim 1, wherein the information about the RACH configuration of the wireless device is received via at least one of: an over the air (OTA) interface, an X2 interface, or a fiber interface.

3. The method of claim 1, further comprising reporting uplink configuration parameters for receiving uplink transmission from the wireless device.

4. The method of claim 1, further comprising receiving, from the base station of the first cell, second signaling indicating the wireless node has been selected for serving at least one of uplink and downlink communications for the wireless device.

5. The method of claim 4, wherein the second signaling indicates the wireless node has been selected for both uplink and downlink communications with the wireless device.

6. The method of claim 4, wherein the second signaling indicates at least one additional wireless node has also been selected for serving uplink communications of the wireless device.

7. A method for wireless communications by a base station, comprising:
    transmitting, to a wireless device, a random access channel (RACH) configuration;
    transmitting, to a wireless node, information about the RACH configuration for the wireless device;
    receiving, from the wireless node, first signaling indicating a RACH transmission detected by the wireless node based on the information about the RACH configuration; and
    transmitting, to the wireless node, second signaling indicating one or more parameters for use in performing at least one of uplink or downlink communications with the wireless device based on the first signaling, wherein the one or more parameters include at least one of timing advance parameters for uplink transmissions, power adjustment parameters, a virtual cell identification, or a modulation and coding scheme.

8. The method of claim 7, wherein the information about the RACH configuration of the wireless device is transmitted via at least one of: an over the air (OTA) interface, an X2 interface, or a fiber interface.

9. The method of claim 7, further comprising receiving uplink configuration parameters for uplink transmission from the wireless node.

10. The method of claim 7, further comprising transmitting, to the wireless node, third signaling indicating the wireless node has been selected for serving at least one of uplink and downlink communications of the wireless device.

11. The method of claim 10, wherein the third signaling indicates the wireless node has been selected for serving both uplink and downlink communications of the wireless device.

12. The method of claim 10, wherein the third signaling indicates at least one additional wireless node has also been selected for serving at least one uplink and downlink communications of the wireless device.

13. The method of claim 7, further comprising transmitting, to the wireless device, parameters for use in at least one of uplink and downlink communications with the wireless node.

14. An apparatus for wireless communications, comprising:
    at least one processor configured to:
        receive, from a base station of a first cell, information about a random access channel (RACH) configuration for a wireless device;
        detect, based on the RACH configuration, a RACH transmission from the wireless device;
        report the detected RACH transmission to the base station of the first cell; and a memory coupled with the at least one processor; and
        receive, from the base station of the first cell, first signaling indicating one or more parameters for use in performing at least one of uplink or downlink communications with the wireless device based on the reported RACH configuration, wherein the one or more parameters include at least one of timing advance parameters for uplink transmissions, power adjustment parameters, a virtual cell identification, or a modulation and coding scheme.

15. The apparatus of claim 14, wherein the information about the RACH configuration of the wireless device is received via at least one of: an over the air (OTA) interface, an X2 interface, or a fiber interface.

16. The apparatus of claim 14, wherein the at least one processor is configured to report uplink configuration parameters for receiving uplink transmission from the wireless device.

17. The apparatus of claim 14, wherein the at least one processor is configured to receive, from the base station of the first cell, second signaling indicating the wireless node has been selected for serving at least one of uplink and downlink communications for the wireless device.

18. The apparatus of claim 17, wherein the second signaling indicates the wireless node has been selected for both uplink and downlink communications with the wireless device.

19. An apparatus for wireless communications, comprising:
at least one processor configured to:
transmit, to a wireless device, a random access channel (RACH) configuration;
transmit, to a wireless node, information about the RACH configuration for the wireless device;
receive, from the wireless node, first signaling indicating a RACH transmission detected by the wireless node based on the information about the RACH configuration; and
transmit, to the wireless node, second signaling indicating one or more parameters for use in performing at least one of uplink or downlink communications with the wireless device based on the first signaling; and
a memory coupled with the at least one processor, wherein the one or more parameters include at least one of timing advance parameters for uplink transmissions, power adjustment parameters, a virtual cell identification, or a modulation and coding scheme.

20. The apparatus of claim 19, wherein the information about the RACH configuration of the wireless device is transmitted via at least one of: an over the air (OTA) interface, an X2 interface, or a fiber interface.

21. The apparatus of claim 19, wherein the at least one processor is configured to receive uplink configuration parameters for uplink transmission from the wireless node.

22. The apparatus of claim 19, wherein the at least one processor is configured to transmit, to the wireless node, third signaling indicating the wireless node has been selected for serving at least one of uplink and downlink communications of the wireless device.

23. The apparatus of claim 22, wherein the third signaling indicates the wireless node has been selected for serving both uplink and downlink communications of the wireless device.

24. The apparatus of claim 19, wherein the at least one processor is configured to transmit, to the wireless device, parameters for use in at least one of uplink and downlink communications with the wireless node.

* * * * *